June 1, 1943.　　　M. NEIDHART　　　2,320,642
HAY HARVESTING MACHINE
Filed Aug. 16, 1941　　　2 Sheets-Sheet 1

Inventor:
Martin Neidhart
by Sommers & Young
Attorneys

Patented June 1, 1943

2,320,642

UNITED STATES PATENT OFFICE 2,320,642

HAY HARVESTING MACHINE

Martin Neidhart, Bonstetten, Zurich, Switzerland

Application August 16, 1941, Serial No. 407,196
In Switzerland August 17, 1940

8 Claims. (Cl. 56—372)

This invention relates to a hay harvesting machine and has as its object the provision of an improved hay harvester which can perform three different operations so as to be used for example for spreading cut grass and the like, disposed in swaths or otherwise, for turning about the spread grass and afterwards for gathering the dried grass to form swaths.

The machine according to the invention comprises rotatable tine fork carriers which are angularly adjustable on a common shaft in such manner as to provide three different general positions for the tine fork carriers, that is two positions in which the planes of rotation of the tine forks are oppositely inclined relatively to the shaft, and a third or median position in which the plane of rotation of the tine forks extends perpendicularly to the shaft.

The accompanying drawings represent by way of example a preferred form of embodiment of the invention.

Figures 4, 5:
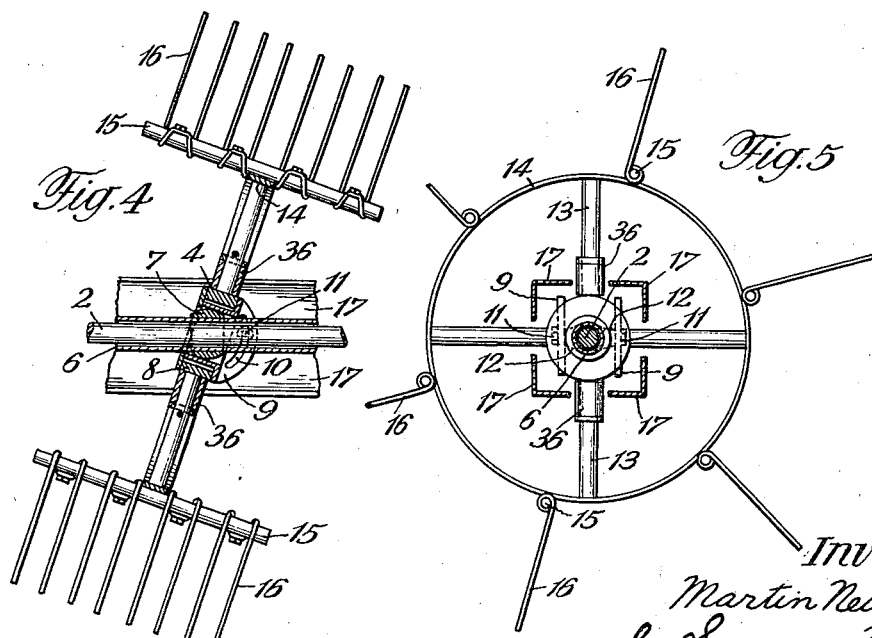
Figure 4 is a fragmentary axial section showing the mounting of a tine fork carrier.
Figure 5 is a transverse section of a tine fork carrier.

1 indicates the road wheels and 2 the road wheel axle of the machine carrying the tine fork carriers 3, 4 and 5. The axle 2 traverses a non-rotatable tube 6 provided with a bearing member 7 (Fig. 4) for each of the two tine fork carriers 3 and 4, the member 7 having a spherically curved outer surface. Each of the carriers 3 and 4 is mounted by means of a sleeve 8 consisting of several parts on the bearing member 7. The sleeve 8 is formed with two flat parallel extensions 9 provided each with a slot 10 forming a circular arc and adapted to receive a set screw 11. The two set screws 11 are screwed into diametrically opposed projections 12 formed on the tube 6 (Fig. 5). The screws and slots 10 and 11 permit angular adjustment of the sleeves 8 and thus of the tine fork carriers 3 and 4 on the bearing members 7 with respect to the axle 2. As it is seen, the two independently adjustable tine fork carriers 3 and 4 are adjusted so as to form different angles with the axle 2. The two carriers 3 and 4 are provided each with four spokes 13 connected at their outer ends by a rim 14 carrying on its circumference six equally spaced transverse rods 15 to which are secured tines 16 forming forks. Between the four spokes 13 of the two tine fork carriers 3 and 4 angle irons 14 extend in the direction of the axle 2, these irons being rigidly connected, at the left hand side of Fig. 1, by an end piece 18 bearing on the tube 6 which is secured with its corresponding end to the frame 25 of the machine. The opposite ends of the angle irons 14 are secured to a disk 19 having a hub 19' loosely mounted on the tube 6. The disk 19 is rigidly connected to a parallel disk 20; both disks, together with the cylindrical connecting rim 20' form a casing constituting the tine fork carrier 5. The disks 19 and 20 carry at their periphery the transverse rods 15 for the tines 16.

The disks 19 and 20 carry on axis 21 on which is mounted a wheel 22 provided with two gear crowns meshing with two gear wheels 23 and 24, the wheel 23 being keyed to the axle 2. The gear so formed is protected by the casing formed by the tine fork carrier 5. When the machine moves forward the axle 2 is rotated by the road wheels 1 by means of clutches acting in one direction only. Laterally of the gear wheel 24, mounted loosely on the axle 2, a guide member 26 is secured to the frame 25 and provided with openings for the passage of bolts 27 carried by an axially movable disk 28 and which may penetrate into openings 24' provided in the gear wheel 24, in order to prevent rotation of the wheel. The disk 28 disposed in the stationary guide member 26 can be axially adjusted by means of a bell crank lever 29 mounted on a bolt 30. This adjustment is effected by means of a connecting rod 31 connected to the lever 29 (Fig. 1), and by means of a two-armed lever 32 and a rod 33 connected with an operating lever 34 carried by the beam 35. When the bolts 27 of the disk 28 are engaging the gear wheel 24 during forward movement of the machine, this wheel cannot turn. One of the gear crowns of the satellite wheel 22 is then rolling along the fixed wheel 24, while its other gear crown is driven by the wheel 23 rotating with the axle 2. The axis 21 turns with the gear 22 around the gear wheel 24 and drives the disks 19 and 20 and thus the entire tine fork carrier 5, while the four angle irons 17 forming an axial extension of this carrier drive the two other fork carriers 3 and 4 on their sleeves 8, owing to abutment of two of the angle irons against rollers 36 carried by two of the spokes 13. All three tine fork carriers 3, 4 and 5 turn in the same direction, the carriers 3 and 4 being guided in the sleeves 8. When the wheel 24 is released by retracting the locking bolts 27, this wheel can loosely turn and the rolling movement of the satellite gear 22 ceases; this latter rotates while remaining in the same place and the drive of the tine fork carriers 3, 4 and 5 is interrupted.

Figure 1:
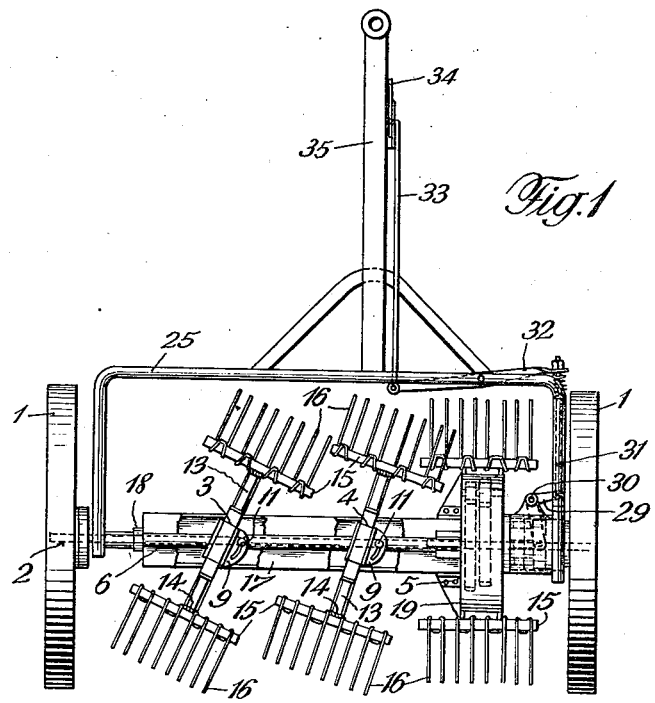
Figures 1, 2 and 3 are each a plan view of the harvesting machine showing the three different positions of operation.
Figure 2:
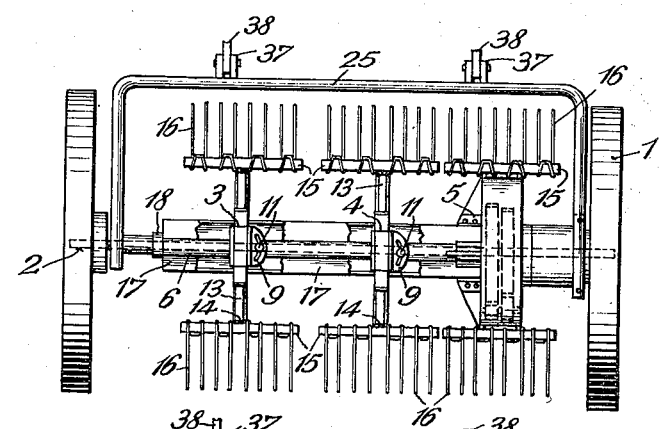
Figure 3:
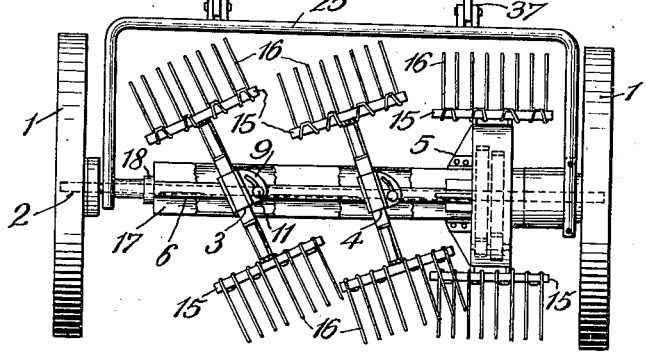
Figure 6:
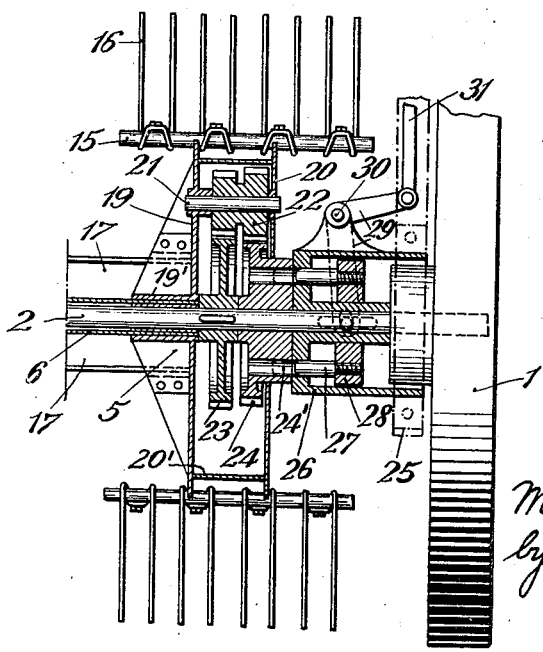
Figure 6 is a fragmentary axial section showing the driving means of a tine fork carrier.

During operation of the machine, the tines 16 of the carrier 5 move in a plane extending at right angles to the axle 2. The plane of rotation of the tines 16 of the carriers 3 and 4 can be angularly adjusted relatively to the axle 2, by moving the bearing sleeves 8 with the slotted plates 9 on the bearing members 7 relatively to the set screws 11 and clamping the carriers by means of the screws in the desired position. The tine fork carriers 3 and 4 can occupy three principal positions, as represented in Figs. 1, 2 and 3, in the positions according to Figs. 1 and 3, the planes of rotation of the tines being oppositely inclined to each other and to the axle 2, while according to Fig. 2 the plane of rotation of the tines of the carriers 3 and 4 extends at right angles to the axle 2, as also the plane of rotation of the tines of the carrier 5. All three tine fork carriers turning in the direction of rotation of the road wheels 1, the machine can be used, when the tine forks are in the position of Fig. 1, to spread cut grass lying in swaths for the purpose of drying it. The spread grass can be turned about later on when the rotating tine forks 16 are in the position according to Fig. 2, in order to accelerate the drying of the grass. Afterwards the spread and dried grass can be gathered by the rotating tine forks to again form swaths when the forks are in the position according to Fig. 3, the machine then operating in the manner of a rake.

The tine forks of the carriers 3, 4 and 5, respectively are angularly displaced relatively to one another so as not to disturb each other during rotation, a similar arrangement being shown for example in my previous U. S. Patent No. 2,201,318.

The beam 35 carried by the frame 25 serves to connect the machine to a tractor; when not used, the beam can be removed from the frame. As shown in Figs. 2 and 3, removable connecting pieces 37 are disposed on the frame 25 destined to receive two beams 38 when using draught animals for pulling the machine.

The described machine can eventually also be used for spreading manure or reducing spread manure.

Various changes and modifications may be made in the practice of my invention without departing from the principle or spirit thereof as defined in the appended claims.

I claim:

1. A hay harvesting machine, comprising a substantially horizontal shaft, a plurality of tine fork carriers mounted on said shaft and revolvable about the axis of said shaft in planes extending transversely with respect to the shaft, and bearings for mounting said fork carriers, said bearings being swingable and adjustable about an axis perpendicular to the axis of the shaft so that the carriers can be adjusted to obliquely oppositely facing positions.

2. A hay harvesting machine comprising a substantially horizontal shaft, a plurality of spaced bearing members having a spherical bearing surface carried by said shaft, a bearing sleeve carried on the spherical surface of each bearing member, a rotatable tine fork carrier mounted on said sleeve and extending transversely to said shaft, and means on said sleeve for adjusting its position on said spherical surface to vary the inclination of the sleeve relatively to the shaft whereby the tine fork carriers can be brought into a median position extending at right angles to the shaft, or into a second position in which the plane of rotation of the carrier is inclined relatively the shaft, or into a third position in which the plane of rotation of the carrier is oppositely inclined relatively to the second position.

3. A hay harvesting machine comprising a substantially horizontal shaft, a tube surrounding said shaft, a bearing member having a spherical bearing surface carried by said tube, a bearing sleeve carried by said spherical surface, a rotatable tine fork carrier mounted on said sleeve and extending transversely with respect to the shaft, and means on said sleeve for adjusting its position on said spherical surface to various angular inclinations with respect to the shaft whereby the tine fork carrier can be brought to a position extending at right angles to the shaft, or into either of two oppositely inclined positions relatively to the shaft.

4. A hay harvesting machine comprising a substantially horizontal shaft, a tube surrounding said shaft, a plurality of spaced bearing members having a spherical bearing surface carried by said tube, a bearing sleeve carried by the spherical surface of each bearing member, a tine fork carrier mounted in each of said sleeves, and means on said sleeves for adjusting the positions thereof on the respective spherical surfaces to various angular inclinations with respect to the shaft whereby the planes of rotation of the tine fork carriers can be brought to extend at right angles relatively to the shaft, or into either of two oppositely inclined positions relatively to the shaft.

5. A hay harvesting machine comprising a substantially horizontal shaft, a plurality of tine fork carriers mounted on said shaft and rotatable in planes extending transversely with respect to the shaft, and means for independently adjusting the position of the different tine fork carriers relatively to the shaft whereby the planes of rotation of the tine fork carriers can be brought into a position extending at right angles to the shaft or into either of two oppositely inclined positions relatively to the shaft.

6. A hay harvesting machine comprising a substantially horizontal shaft, a plurality of tine fork carriers mounted on said shaft and rotatable in planes extending transversely with respect to the shaft, means for independently adjusting the angular position of the tine fork carriers relatively to the shaft whereby the planes of rotation of the tine fork carriers can be brought into a position extending at right angles to the shaft or into either of two oppositely inclined positions relatively to the shaft, a further rotatable tine fork carrier mounted on said shaft in angularly fixed position relative to the shaft, a gear associated with said angularly fixed tine fork carrier for transmitting driving power to said angularly adjustable tine fork carriers, and clutch means for engaging of releasing said gear.

7. A hay harvesting machine comprising a substantially horizontal shaft, a plurality of tine fork carriers mounted on said shaft and revolvable about the axis of said shaft in planes extending transversely with respect to the shaft, bearings for independently mounting said fork carriers, said bearings being independently swingable and adjustable about axes perpendicular to the axis of the shaft so that the planes of rotation of the tine fork carriers can be brought into a position extending at right angles to the shaft or into either of two oppositely inclined positions relatively to the shaft, a further rotatable tine fork carrier mounted on said shaft in angularly fixed position relative to the shaft, a gear associated with said angularly fixed tine fork carrier for transmitting driving power to said angularly adjustable tine fork carriers, a casing enclosing said gear, and clutch means for engaging and releasing said gear.

8. A hay harvesting machine comprising a substantially horizontal shaft, a plurality of bearings mounted on said shaft, a plurality of tine fork carriers each rotatably mounted on one of said bearings so as to be revolvable about the axis of said shaft in planes extending transversely with respect to the shaft, means for independently adjusting the angular position of the tine fork carriers on the bearings and relatively to the shaft whereby the planes of rotation of the tine fork carriers can be brought into a position extending at right angles to the shaft or into either of two oppositely inclined positions relatively to the shaft, a rotatable casing forming a further tine fork carrier mounted on said shaft in angularly fixed position relative to the shaft, a gear enclosed in said casing for transmitting driving power to said angularly adjustable tine fork carriers, and clutch means for engaging and releasing said gear.

MARTIN NEIDHART.